US012168304B2

(12) United States Patent
Fennell

(10) Patent No.: US 12,168,304 B2
(45) Date of Patent: Dec. 17, 2024

(54) HAIR CLIPPER COVER ASSEMBLY

(71) Applicant: Tanesha Fennell, Wylie, TX (US)

(72) Inventor: Tanesha Fennell, Wylie, TX (US)

(*) Notice: Subject to any disclaimer, the term of this patent is extended or adjusted under 35 U.S.C. 154(b) by 254 days.

(21) Appl. No.: 17/890,846

(22) Filed: Aug. 18, 2022

(65) Prior Publication Data

US 2024/0058976 A1 Feb. 22, 2024

(51) Int. Cl.
*B26B 19/48* (2006.01)

(52) U.S. Cl.
CPC .................................... *B26B 19/48* (2013.01)

(58) Field of Classification Search
CPC ...................................................... B26B 19/48
USPC ........................................................... 30/537
See application file for complete search history.

(56) References Cited

U.S. PATENT DOCUMENTS

| | | | | |
|---|---|---|---|---|
| 2,597,552 | A | 5/1952 | Wagner | |
| 4,251,915 | A | 2/1981 | Ullman | |
| 4,925,149 | A | 5/1990 | DiFrancesca | |
| 5,265,720 | A | 11/1993 | Meliconi | |
| D402,405 | S * | 12/1998 | Cockerille | D3/205 |
| 6,212,790 | B1 | 4/2001 | Stetson | |
| 7,231,719 | B2 | 6/2007 | Butcher | |
| D556,380 | S | 11/2007 | Long | |
| D580,179 | S * | 11/2008 | Vu | D4/199 |
| 2005/0015997 | A1* | 1/2005 | Roble | B26B 19/3813 30/232 |
| 2008/0189965 | A1* | 8/2008 | Trissel | A45D 27/46 30/538 |
| 2010/0313385 | A1 | 12/2010 | Brahler | |
| 2012/0291289 | A1* | 11/2012 | Glezerman | B26B 21/4081 30/34.05 |
| 2015/0314463 | A1* | 11/2015 | Mgbeahurike | B26B 19/48 30/41 |
| 2018/0338595 | A1 | 11/2018 | Jones | |

FOREIGN PATENT DOCUMENTS

| | | |
|---|---|---|
| CA | 2075323 | 6/1993 |

* cited by examiner

*Primary Examiner* — Omar Flores Sanchez

(57) ABSTRACT

A hair clipper cover assembly includes a sleeve for insertably receiving a hair clipper. The sleeve is comprised of a friction enhancing material thereby facilitating the sleeve to frictionally engage a surface upon which the hair clipper is placed. In this way the sleeve inhibits the hair clipper from traveling on the surface as a result of vibration produced by the hair clipper when the hair clipper is turned on. Thus, the sleeve inhibits the hair clipper from falling off of a table. The sleeve has a pair of lever slots that is each integrated into the sleeve thereby facilitating a respective one of the lever slots to accommodate a blade adjustment lever on the hair clipper. The sleeve has a power button opening and a power cord opening to accommodate a respective power button and a power cord of the hair clipper.

7 Claims, 7 Drawing Sheets

HAIR CLIPPER COVER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to sleeve devices and more particularly pertains to a new sleeve device for inhibiting a hair clipper from traveling on a surface due to vibration. The device includes a sleeve that is structured to insertably receive a hair clipper. The sleeve has a pair of lever slots to accommodate a blade adjustment lever of the hair clipper. Additionally, the sleeve has a power button hole for exposing a power button on the hair clipper. The sleeve has a power cord hole for accommodating a power cord of the hair clipper. Furthermore, the sleeve is comprised of a friction enhancing material to inhibit the hair clipper from traveling along a support surface due to vibration produced by the hair clipper when the hair clipper is turned on.

(2) Description of Related Art Including Information Disclosed Under 37 CFR 1.97 and 1.98

The prior art relates to sleeve devices including a hair clipper cover that includes a flap and a snap fastener for securing the flap around a hair clipper. The prior art discloses a dry shaver that includes a resilient housing for protecting the dry shaver from damage. The prior art discloses a cover for electric hair clippers that has arms and legs to simulate a humanoid appearance for comforting a child. The prior art discloses a variety of covers for a variety of objects that do not include hair clippers.

BRIEF SUMMARY OF THE INVENTION

An embodiment of the disclosure meets the needs presented above by generally comprising a sleeve for insertably receiving a hair clipper. The sleeve is comprised of a friction enhancing material thereby facilitating the sleeve to frictionally engage a surface upon which the hair clipper is placed. In this way the sleeve inhibits the hair clipper from traveling on the surface as a result of vibration produced by the hair clipper when the hair clipper is turned on. Thus, the sleeve inhibits the hair clipper from falling off of a table. The sleeve has a pair of lever slots that is each integrated into the sleeve thereby facilitating a respective one of the lever slots to accommodate a blade adjustment lever on the hair clipper. The sleeve has a power button opening and a power cord opening to accommodate a respective power button and a power cord of the hair clipper.

An additional embodiment of the disclosure meets the needs presented above by generally comprising a hair clipper which has a blade adjustment lever, a power button and a power cord. A sleeve is included for insertably receiving the hair clipper. The sleeve is comprised of a friction enhancing material thereby facilitating the sleeve to frictionally engage a surface upon which the hair clipper is placed. In this way the sleeve inhibits the hair clipper from traveling on the surface as a result of vibration produced by the hair clipper when the hair clipper is turned on. Thus, the sleeve inhibits the hair clipper from falling off of a table. The sleeve has a pair of lever slots that is each integrated into the sleeve thereby facilitating a respective one of the lever slots to accommodate a blade adjustment lever on the hair clipper. The sleeve has a power button opening and a power cord opening to accommodate a respective power button and a power cord of the hair clipper.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
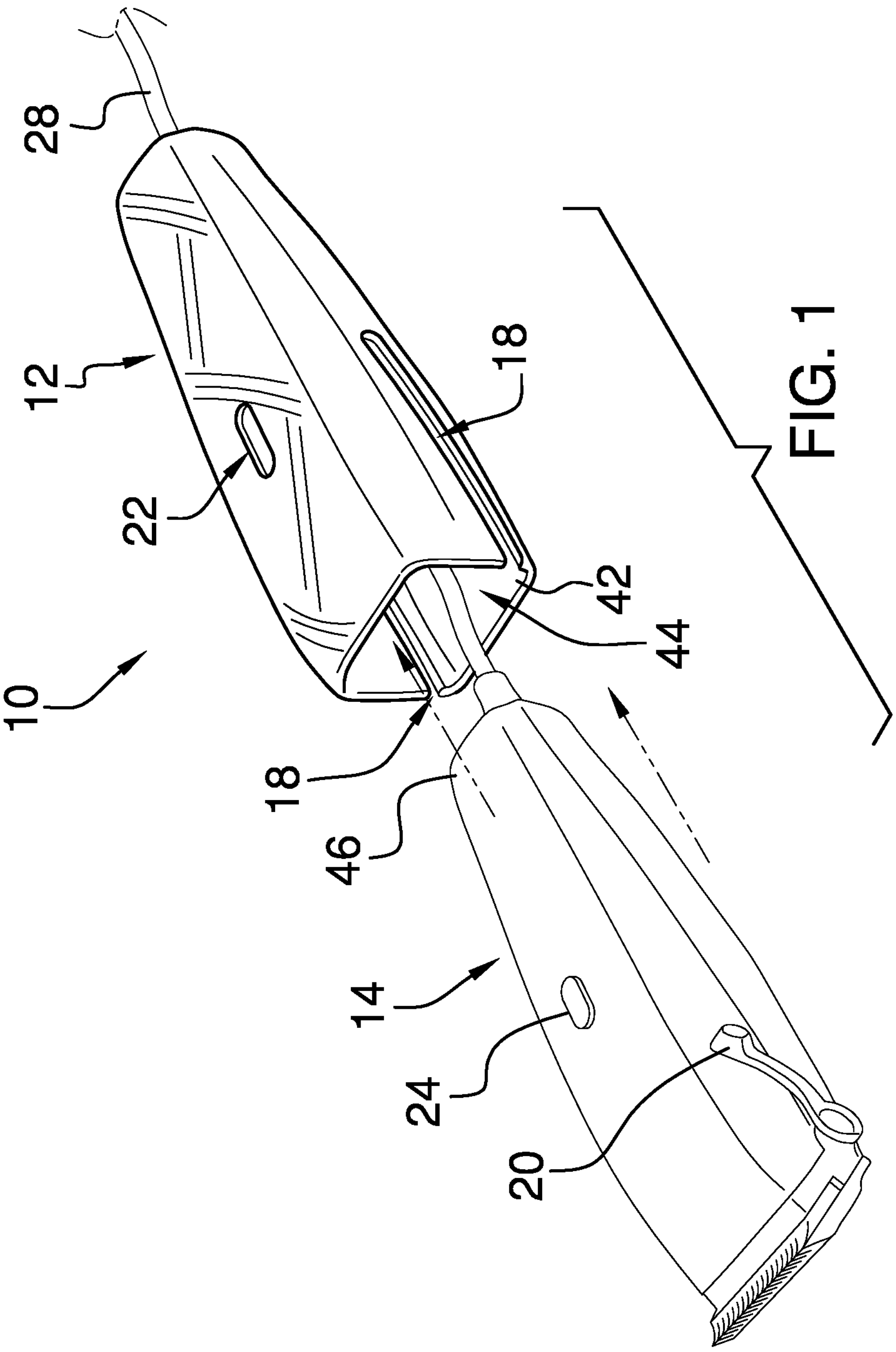
FIG. 1 is an exploded perspective view of a hair clipper cover assembly according to an embodiment of the disclosure.
Figure 2:
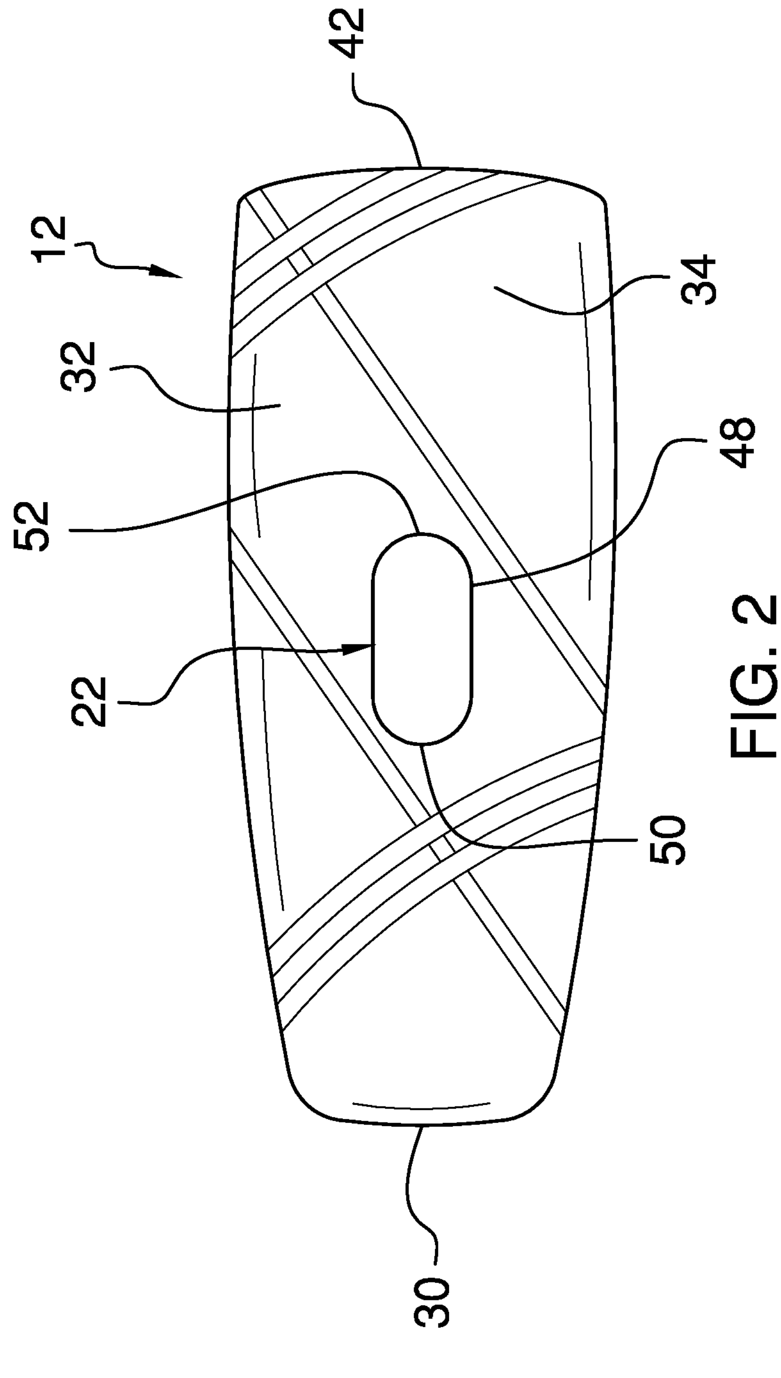
FIG. 2 is a top view of an embodiment of the disclosure.
Figure 3:
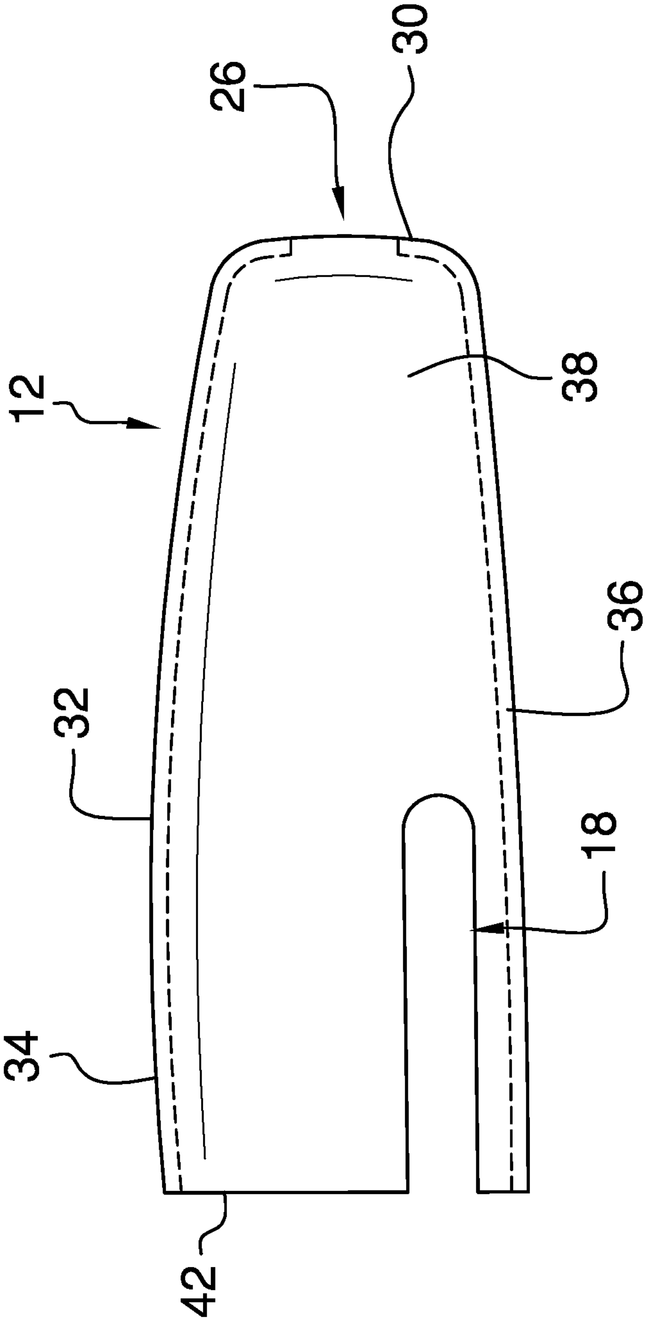
FIG. 3 is a left side view of an embodiment of the disclosure.
Figure 4:
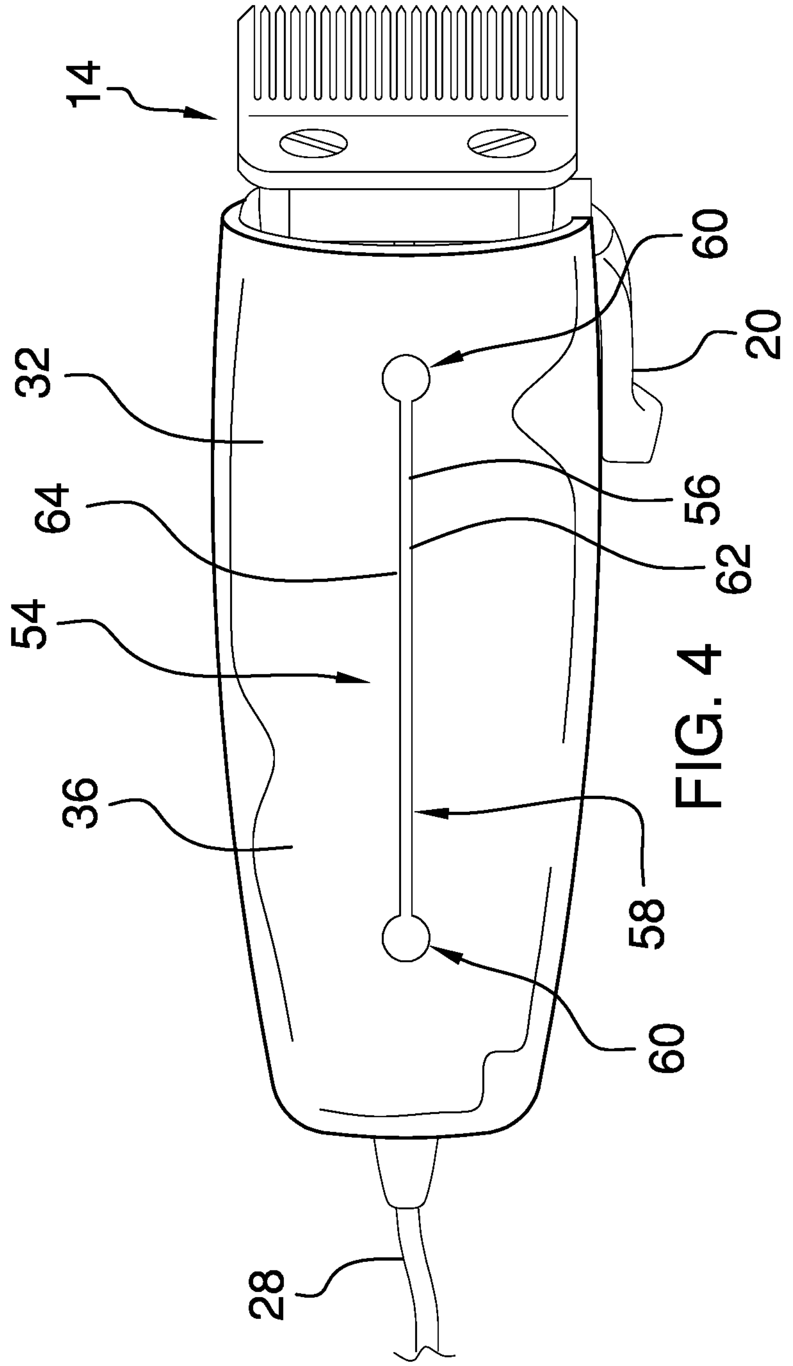
FIG. 4 is a bottom in-use view of an embodiment of the disclosure.
Figure 5:
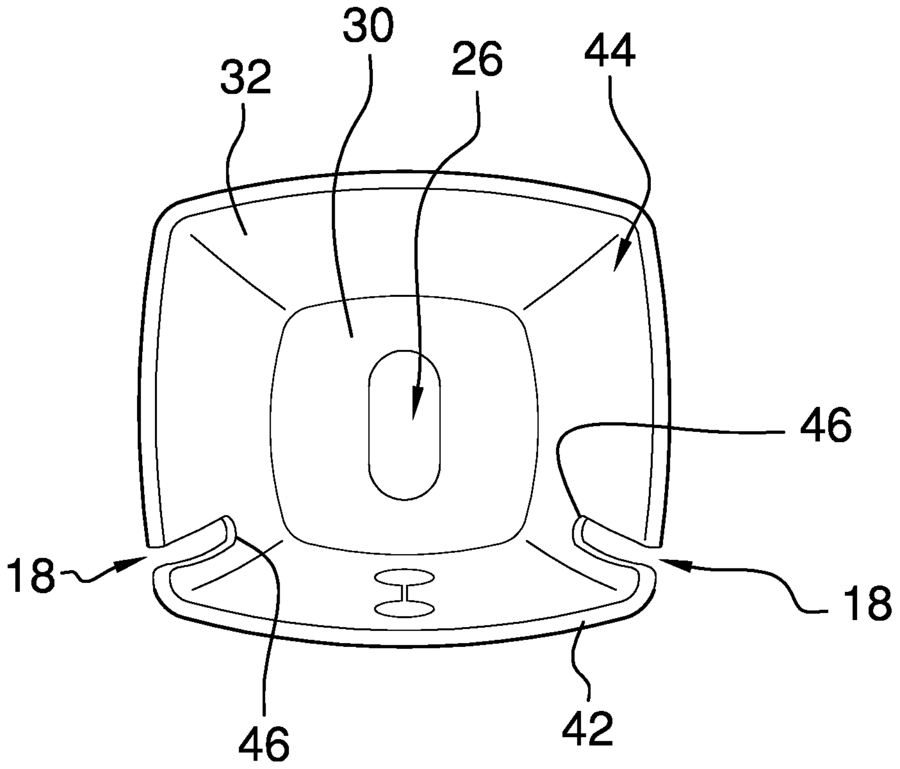
FIG. 5 is a front view of an embodiment of the disclosure.
Figure 6:
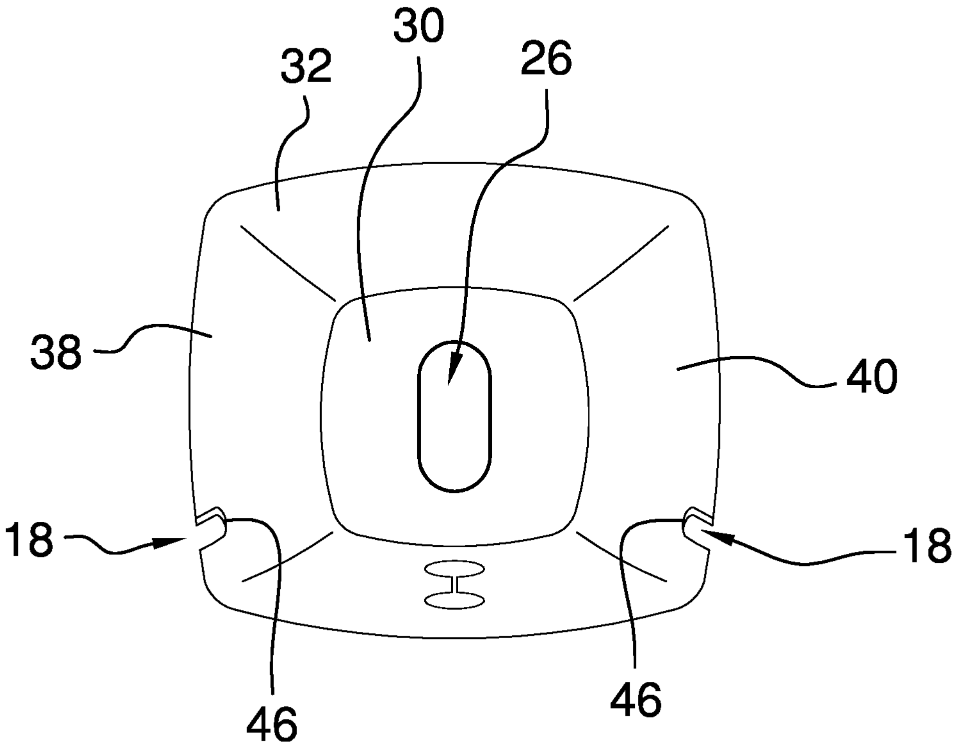
FIG. 6 is a back view of an embodiment of the disclosure.
Figure 7:
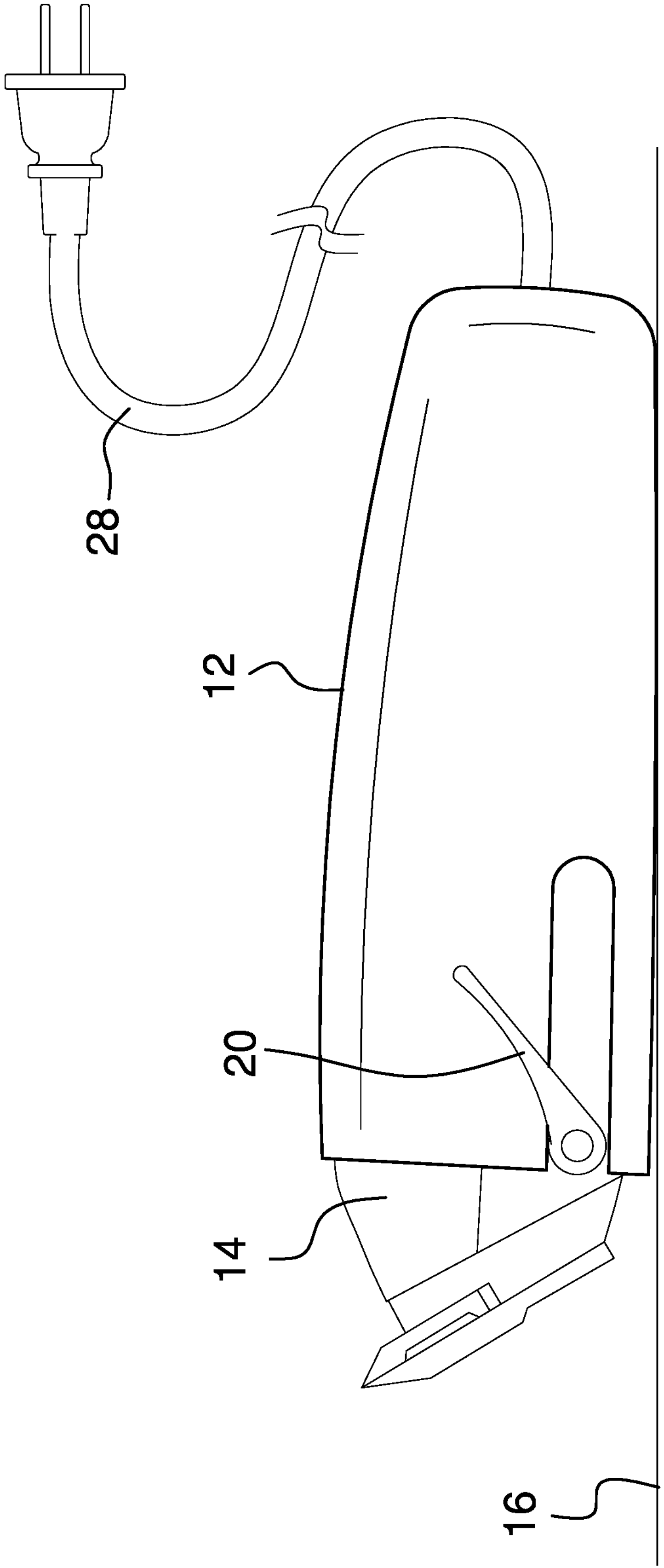
FIG. 7 is a perspective in-use view of an embodiment of the disclosure.

With reference now to the drawings, and in particular to FIGS. 1 through 7 thereof, a new sleeve device embodying the principles and concepts of an embodiment of the disclosure and generally designated by the reference numeral 10 will be described.

As best illustrated in FIGS. 1 through 7, the hair clipper cover assembly 10 generally comprises a sleeve 12 for insertably receiving a hair clipper 14. The sleeve 12 is comprised of a friction enhancing material thereby facilitating the sleeve 12 to frictionally engage a surface 16 upon which the hair clipper 14 is placed. In this way the sleeve 12 inhibits the hair clipper 14 from traveling on the surface 16 as a result of vibration produced by the hair clipper 14 when the hair clipper 14 is turned on to inhibit the hair clipper 14 from falling off of a table, for example. The friction enhancing material may include, but not be limited to, rubber, silicon or other similar type of material. The hair clipper 14 may be an electrical hair clipper of any conventional design that would commonly be employed in a hair salon or a barber shop, for example.

The sleeve 12 has a pair of lever slots 18 that is each integrated into the sleeve 12 thereby facilitating a respective one of the lever slots 18 to accommodate a blade adjustment lever 20 on the hair clipper 14. The sleeve 12 has a power button opening 22 that is integrated into the sleeve 12 thereby facilitating the power button opening 22 to expose a power button 24 on the hair clipper 14 such that the power button 24 is accessible when the sleeve 12 is positioned around the hair clipper 14. Additionally, the sleeve 12 has a power cord opening 26 that is integrated into the sleeve 12 thereby facilitating the power cord opening 26 to accommodate a power cord 28 of the hair clipper 14.

The sleeve 12 has a back end 30 and an outer wall 32 extending forwardly from the back end 30, and the outer wall 32 has a top side 34, a bottom side 36, a first lateral side 38 and a second lateral side 40. The outer wall 32 has a distal edge 42 with respect to the back end 30 to define a hair clipper opening 44 extending into an interior of the sleeve 12 for insertably receiving a rear end 46 of the hair clipper 14. The outer wall 32 flares outwardly between the back end 30 and the distal edge 42 such that the hair clipper opening 44 has a length and a width that is greater than a length and a width of the back end 30. The top side 34 curves downwardly toward the bottom side 36 at a point that is spaced from the distal edge 42.

Each of the lever slots 18 extends through a respective one of the first lateral side 38 and the second lateral side 40 of the outer wall 32, and each of the lever slots 18 extends from the distal edge 42 toward the back end 30. Each of the lever slots 18 is positioned closer to the bottom side 36 of the outer wall 32 than the top side 34 of the outer wall 32. Each of the lever slots 18 has a terminal end 46 with respect to the distal edge 42 and the terminal end 46 of each of the lever slots 18 is rounded. The power button opening 22 extends through the top side 34 of the outer wall 32 of the sleeve 12. The power button opening 22 has a bounding edge 48 and the bounding edge 48 has a rear side 50 and a front side 52. The power button opening 22 is elongated along an axis extending through the front side 52 and the rear side 50 and the power button opening 22 is centrally positioned on the top side 34.

The outer wall 32 has a slit 54 extending through the bottom side 36 and the slit 54 has a bounding edge 56, and the bounding edge 56 of the slit 54 has a straightened portion 58 extending between a pair of rounded portions 60. Each of the rounded portions 60 is continuously arcuate about a center of the rounded portions 60 such that each of the rounded portions 60 has a circular shape. The straightened portion 58 has a first side 62 and a second side 64 that are spaced apart from each other and are oriented parallel with each other. Furthermore, the slit 54 is elongated along an axis extending between the back end 30 of the sleeve 12 and the distal edge 42 of the outer wall 32 of the sleeve 12.

In use, the power cord 28 of the hair clipper 14 is extended into the hair clipper opening 44 in the sleeve 12 and outwardly through the power cord opening 26 to facilitate the hair clipper 14 to be inserted into the sleeve 12. Furthermore, the blade adjustment lever 20 on the hair clipper 14 extends into a respective one of the lever slots 18 when the hair clipper 14 is inserted into the sleeve 12 to facilitate the hair clipper 14 to be fully seated into the sleeve 12. In this way the hair clipper 14 can be employed as it would normally be when it is not positioned in the sleeve 12. Furthermore, the sleeve 12 inhibits the hair clipper 14 from traveling along the table, for example, or other surface upon which the hair clipper 14 is positioned when the hair clipper 14 is turned on. Thus, the hair clipper 14 can be temporarily stored on the table, for example, while the hair clipper 14 is turned on without falling off of the table and potentially being damaged.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word “comprising” is used in its non-limiting sense to mean that items following the word are included, but items not specifically mentioned are not excluded. A reference to an element by the indefinite article “a” does not exclude the possibility that more than one of the element is present, unless the context clearly requires that there be only one of the elements.

I claim:

1. A hair clipper sleeve assembly for inhibiting a hair clipper from moving as a result of vibration when the hair clipper is resting on a support surface, said assembly comprising:

a sleeve for insertably receiving a hair clipper, said sleeve being comprised of a friction enhancing material thereby facilitating said sleeve to frictionally engage a surface upon which the hair clipper is placed such that said sleeve inhibits the hair clipper from traveling on the surface as a result of vibration produced by the hair clipper when the hair clipper is turned on wherein said sleeve is configured to inhibit the hair clipper from falling off of a table, said sleeve having a pair of lever slots each being integrated into said sleeve thereby facilitating a respective one of said lever slots to accommodate a blade adjustment lever on the hair clipper, said sleeve having a power button opening being integrated into said sleeve thereby facilitating said power button opening to expose a power button on the hair clipper such that the power button is accessible when said sleeve is positioned around the hair clipper, said sleeve having a power cord opening being integrated into said sleeve thereby facilitating said power cord opening to accommodate a power cord of the hair clipper;

wherein said sleeve has a back end and an outer wall extending forwardly from said back end, said outer wall having a top side, a bottom side, a first lateral side and a second lateral side, said outer wall having a distal edge with respect to said back end to define a hair clipper opening extending into an interior of said sleeve for insertably receiving a rear end of the hair clipper, said outer wall flaring outwardly between said back end and said distal edge such that said hair clipper opening has a length and a width being greater than a length and a width of said back end, said top side curving downwardly toward said bottom side at a point being spaced from said distal edge; and wherein said outer wall has a slit extending through said bottom side, said slit having a bounding edge, said bounding edge of said slit having a straightened portion extending between a pair of rounded portions.

2. A hair clipper sleeve assembly for inhibiting a hair clipper from moving as a result of vibration when the hair clipper is resting on a support surface, said assembly comprising:

a sleeve for insertably receiving a hair clipper, said sleeve being comprised of a friction enhancing material thereby facilitating said sleeve to frictionally engage a surface upon which the hair clipper is placed such that said sleeve inhibits the hair clipper from traveling on the surface as a result of vibration produced by the hair clipper when the hair clipper is turned on wherein said sleeve is configured to inhibit the hair clipper from falling off of a table, said sleeve having a pair of lever slots each being integrated into said sleeve thereby facilitating a respective one of said lever slots to accommodate a blade adjustment lever on the hair clipper, said sleeve having a power button opening being integrated into said sleeve thereby facilitating said power button opening to expose a power button on the hair clipper such that the power button is accessible when said sleeve is positioned around the hair clipper, said sleeve having a power cord opening being integrated into said sleeve thereby facilitating said power cord opening to accommodate a power cord of the hair clipper;

wherein said sleeve has a back end and an outer wall extending forwardly from said back end, said outer wall having a top side, a bottom side, a first lateral side and a second lateral side, said outer wall having a distal edge with respect to said back end to define a hair clipper opening extending into an interior of said sleeve for insertably receiving a rear end of the hair clipper, said outer wall flaring outwardly between said back end and said distal edge such that said hair clipper opening has a length and a width being greater than a length and a width of said back end, said top side curving downwardly toward said bottom side at a point being spaced from said distal edge;

wherein each of said lever slots extends through a respective one of said first lateral side and said second lateral side of said outer wall;

wherein each of said lever slots extends from said distal edge toward said back end;

wherein each of said lever slots is positioned closer to said bottom side of said outer wall than said top side of said outer wall; and wherein each of said lever slots has a terminal end with respect to said distal edge, said terminal end of each of said lever slots being rounded.

3. The assembly according to claim 1, wherein said power button opening extends through said top side of said outer wall of said sleeve, said power button opening having a bounding edge, said bounding edge having a rear side and a front side, said power button opening being elongated along an axis extending through said front side and said rear side, said power button opening being centrally positioned on said top side.

4. The assembly according to claim 1, wherein each of said rounded portions is continuously arcuate about a center of said rounded portions such that each of said rounded portions has a circular shape.

5. The assembly according to claim 1, wherein said straightened portion has a first side and a second side being spaced apart from each other and being oriented parallel with each other, said slit being elongated along an axis extending between said back end of said sleeve and said distal edge of said outer wall of said sleeve.

6. The assembly according to claim 1, further comprising:

each of said lever slots extending through a respective one of said first lateral side and said second lateral side of said outer wall, each of said lever slots extending from said distal edge toward said back end, each of said lever slots being positioned closer to said bottom side of said outer wall than said top side of said outer wall, each of said lever slots having a terminal end with respect to said distal edge, said terminal end of each of said lever slots being rounded, said power button opening extending through said top side of said outer wall of said sleeve, said power button opening having a bounding edge, said bounding edge having a rear side and a front side, said power button opening being elongated along an axis extending through said front side and said rear side, said power button opening being centrally positioned on said top side, each of said rounded portions being continuously arcuate about a center of said rounded portions such that each of said rounded portions has a circular shape, said straightened portion having a first side and a second side being spaced apart from each other and being oriented parallel with each other, said slit being elongated along an axis extending between said back end of said sleeve and said distal edge of said outer wall of said sleeve.

7. A hair clipper cover system for inhibiting a hair clipper from moving as a result of vibration when the hair clipper is resting on a support surface, said system comprising:

a hair clipper having a blade adjustment lever, a power button and a power cord; a sleeve for insertably receiving said hair clipper, said sleeve being comprised of a friction enhancing material thereby facilitating said sleeve to frictionally engage a surface upon which said hair clipper is placed such that said sleeve inhibits said hair clipper from traveling on the surface as a result of vibration produced by said hair clipper when said hair clipper is turned on wherein said sleeve is configured to inhibit said hair clipper from falling off of a table, said sleeve having a pair of lever slots each being integrated into said sleeve thereby facilitating a respective one of said lever slots to accommodate said blade adjustment lever on said hair clipper, said sleeve having a power button opening being integrated into said sleeve thereby facilitating said power button opening to expose said power button on said hair clipper such that said power button is accessible when said sleeve is positioned around said hair clipper, said sleeve having a power cord opening being integrated into said sleeve thereby facilitating said power cord opening to accommodate said power cord of said hair clipper, said sleeve having a back end and an outer wall extending forwardly from said back end, said outer wall having a top side, a bottom side, a first lateral side and a second lateral side, said outer wall having a distal edge with respect to said back end to define a hair clipper opening extending into an interior of said sleeve for insertably receiving a rear end of said hair clipper, said outer wall flaring outwardly between said back end and said distal edge such that said hair clipper opening has a length and a width being greater than a length and a width of said back end, said top side curving downwardly toward said bottom side at a point being spaced from said distal edge, each of said lever slots extending through a respective one of said first lateral side and said second lateral side of said outer wall, each of said lever slots extending from said distal edge toward said back end, each of said lever slots being positioned closer to said bottom side of said outer wall than said top side of said outer wall, each of said lever slots having a terminal end with respect to said distal edge, said terminal end of each of said lever slots being rounded, said power button opening extending through said top side of said outer wall of said sleeve, said power button opening having a bounding edge, said bounding edge having a rear side and a front side, said power button opening being elongated along an axis extending through said front side and said rear side, said power button opening being centrally positioned on said top side, said outer wall having a slit extending through said bottom side, said slit having a bounding edge, said bounding edge of said slit having a straightened portion extending between a pair of rounded portions, each of said rounded portions being continuously arcuate about a center of said rounded portions such that each of said rounded portions has a circular shape, said straightened portion having a first side and a second side being spaced apart from each other and being oriented parallel with each other, said slit being elongated along an axis extending between said back end of said sleeve and said distal edge of said outer wall of said sleeve.

* * * * *